United States Patent [19]
Beck

[11] 3,969,812
[45] July 20, 1976

[54] METHOD OF MANUFACTURING AN OVERWRAPPED PRESSURE VESSEL

[75] Inventor: Emory J. Beck, Golden, Colo.

[73] Assignee: Martin Marietta Corporation, New York, N.Y.

[22] Filed: Apr. 19, 1974

[21] Appl. No.: 462,356

[52] U.S. Cl. .............................. 29/421 R; 29/446; 29/452; 29/458; 220/3; 242/2
[51] Int. Cl.² ......................................... B23P 17/00
[58] Field of Search ............. 29/446, 458, 452, 421; 242/2, 3; 220/3

[56] References Cited
UNITED STATES PATENTS

| 2,030,818 | 2/1936 | Harter | 220/3 UX |
| 2,227,817 | 1/1941 | Allen | 220/3 UX |
| 2,858,992 | 11/1958 | Wentz | 242/2 |
| 3,023,495 | 3/1962 | Noland | 29/446 X |
| 3,411,727 | 11/1968 | Uhlig et al. | 242/2 |
| 3,448,253 | 6/1969 | Bramblett et al. | 242/2 X |

*Primary Examiner*—Charlie T. Moon

[57] ABSTRACT

A pressure vessel of the type wherein a metallic liner in the shape of a cylindrical portion with a dome-shaped portion at each end thereof is overwrapped by a plurality of layers of resin coated, single fiberglass filaments. A four-step wrapping technique reinforces the vessel with overwrap material at the most likely areas for vessel failure. Overwrapping of the vessel is followed by a sizing pressurization cycle which induces a compressive prestress into the liner and thereby permits the liner to deform elastically through an increased strain range.

14 Claims, 5 Drawing Figures

METHOD OF MANUFACTURING AN OVERWRAPPED PRESSURE VESSEL

The invention described herein was made in the performance of work under a NASA contract (NAS 9-12540) and is subject to the provisions of section 305 of the National Aeronautics and Space Act of 1958, Public Law 85-568 (72 Stat. 435; 42 U.S.D 2457).

BACKGROUND OF THE INVENTION

The present invention relates to pressure vessels for storing highly pressurized fluid material, and particularly to portable, lightweight pressure vessels of the type wherein a thin, lightweight metallic liner having a cylindrical portion and a pair of dome-shaped end portions is completely overwrapped by a plurality of layers of filament material. The invention is particularly applicable to liners wrapped with resin-coated, single-glass filaments (commonly called wet-windings or pre-impregnated windings). The present invention further relates to an overwrapping technique wherein the filament wrapping sequence is specifically designed to reinforce the junction of the cylindrical portion with each of the dome portions.

The term "completely overwrapped", as used herein and in the art, encompasses a vessel in which the cylindrical portion and the dome-shaped end portions are completely overwrapped, but which also may include small neck-shaped portions at the outer extremities of the dome-shaped portions which may, or may not, be overwrapped. This will be readily apparent to those skilled in the art.

A pressure vessel made in accordance with the present invention may be particularly designed for use in a compressed air breathing system of the type which would be carried by a fireman or scuba diver. Pressure vessels of this type must, of course, be designed with a view toward obtaining minimum weight-maximum volume characteristics, while nonetheless being capable of satisfying the safety objectives of federal and local regulatory agencies. For example, a pressure vessel made in accordance with the present invention has been specifically designed to satisfy the following specifications:

1. Maximum weight of 9.0 pounds,
2. Maximum operating pressure of 4500 PSIG (charge pressure of 4,000 PSIG),
3. Minimum contained volume of 280 cubic inches,
4. Proof pressure 6750 PSIG,
5. Minimum burst pressure of 9,000 PSIG,
6. Inexpensive enough to justify commercial production.

It should be noted that the foregoing specifications are set forth basically as an example of the characteristics which a pressure vessel manufactured in accordance with the present invention can satisfy. More particularly, the foregoing specifications indicate the high operating pressures (i.e. 4500 PSIG for example) at which a pressure vessel in accordance with the present invention can function and yet be relatively light in weight and inexpensive enough to satisfy commercial production cost requirements.

It is contemplated that pressure vessels for many and varied applications may be manufactured in accordance with the present invention. Further examples of pressure vessels which can be made in accordance with the present invention include skin diving breathing apparatus, and storage bottles for cryogens, chemicals, fuels and gases. In fact, the method of manufacture in accordance with the present invention may be utilized to produce any overwrapped vessel where both polar and cylindrical reinforcement is utilized. Naturally, the specifications and operating characteristics may vary for pressure vessels for uses other than those set forth in the specific example set forth above.

Known pressure vessels which can operate at high pressures include all metallic vessels. An all metallic vessel which would satisfy the strength requirements for operating at high pressures generally requires a grade of steel whose cost makes commercial production of such a vessel unfeasible.

Pressure vessels which are known and which are less expensive to produce are those where a liner is overwrapped with a plurality of filament layers. Typical of the overwrapping technique for such a vessel is a 2-step overwrapping technique wherein a liner is completely overwrapped in the polar direction, followed by a plurality of circular windings about the cylindrical portion. Particularly when overwrapping is performed by wet winding, and the 2-step wrapping sequence is used, the vessel is generally inadequately reinforced at what applicant has found to be the most critical area of the vessel, i.e., the junction of the cylindrical region with the dome region. This is because filament material cannot be effectively wound cylindrically over the junction or it would tend to slough or slip down the dome area.

SUMMARY OF THE PRESENT INVENTION

The present invention discloses a completely overwrapped pressure vessel which is suitable for withstanding considerable fluid pressures, as well as being light enough in weight to be carried on a fireman's back, and inexpensive enough to justify commercial production cost requirements. In terms of cost and weight specifications the use of aluminum as a liner, and of S-2 fiberglass for the filament have been found to be particularly satisfactory. Of course, the present invention can be utilized to produce pressure vessels which meet specifications other than the aforesaid specific design specifications.

Moreover, the foregoing materials have been found to be compatible for achieving an advantageous prestress condition for the completely overwrapped pressure vessel. Specifically, since the operating pressures of the vessel will generally exceed the yield strength of the metallic liner, it has been found that a prestressed relationship may be induced between the overwrap and the liner causing both the overwrap and the liner to operate elastically through a strain range which exceeds the liner strain range for the operating pressures. Such a stress relationship also serves to increase the buckling strength of the liner.

The present invention also relates to an overwrapped pressure vessel wherein wrapping of filament material is effected in a manner which insures that cylindrically wound filament material covers the junctions between the cylindrical part of the liner and the hemispherical-shaped dome portions. This is accomplished by a four-step overwrapping technique wherein (1) polar oriented filament is wound to completely overwrap the liner, (2) cylindrically oriented filament material is then wound which covers the cylindrical portion and the junctions of the cylindrical portion with each dome portion, (3) additional polar oriented filament material is wound to hold the cylindrically wound filament against movement relative to the liner, and (4) additional cylindrically oriented filament material is wound over the central portion of the vessel.

Accordingly, it is an object of the present invention to manufacture an overwrapped pressure vessel wherein the overwrapping sequence is designed to reinforce the area at the junction of the cylindrical and dome-shaped portions of the vessel liner.

It is another object of the present invention to manufacture a completely overwrapped pressure vessel wherein a predetermined compressive stress has been induced into the metallic liner.

These and other objects and advantages of the present invention will become further apparent from the following description and the accompanying drawings wherein.

DETAILED DESCRIPTION OF THE INVENTION

Figure 1:
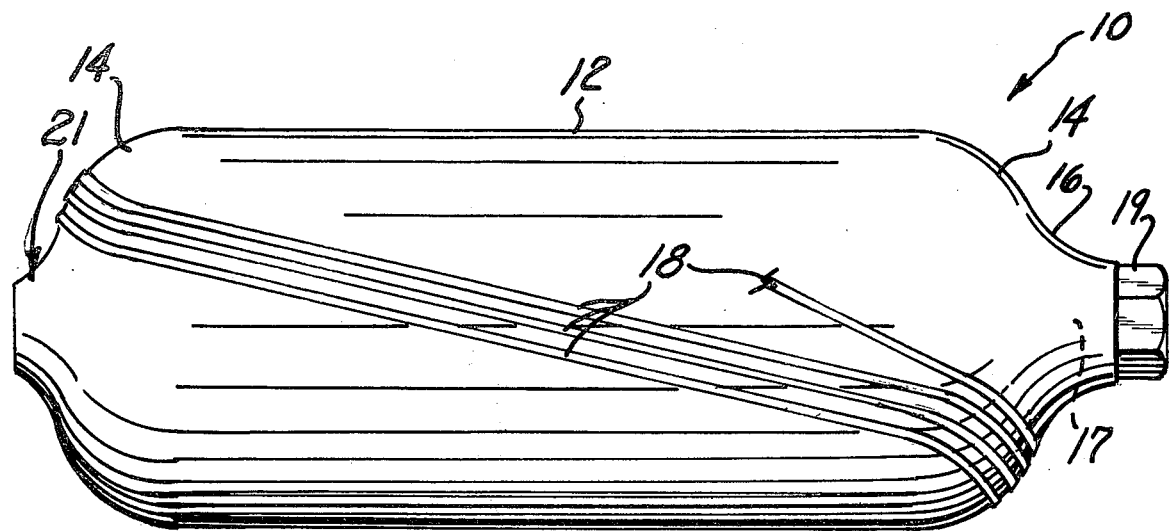
FIG. 1 is a schematic view of a liner and illustrating one type of filament winding.
Figure 2:
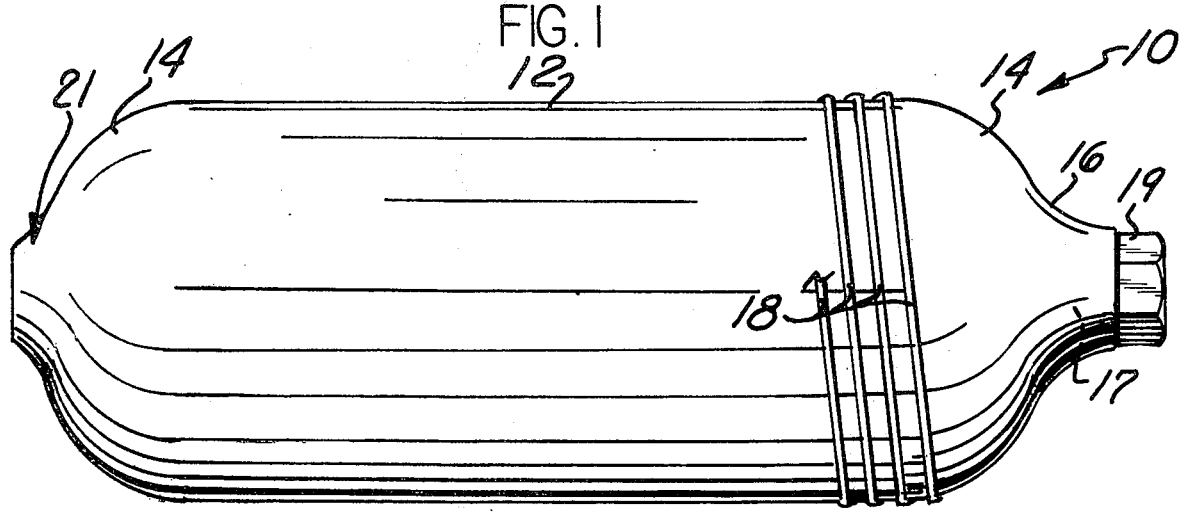
FIG. 2 is a schematic view of a liner and illustrating another type of filament winding.

FIGS. 1 and 2 illustrate the overall shape of the vessel liner, and the two types of windings which are performed to practice a part of the present invention. As clearly shown in FIGS. 1 and 2, liner 10 includes a cylindrical portion 12, and a pair of hemispherical-shaped dome portions 14 at each end of the cylindrical portion. At least one dome portion 14 includes a neck portion 16, and the neck portion will contain a fluid port therein. In FIGS. 1 through 5, fluid port 17 is shown at one end of the vessel, and the other end is suitably contoured, as at 21, but does not contain a fluid port. Naturally, suitable stopper means such as 19 will be provided to seal the fluid ports in the neck portion.

FIG. 1 illustrates a pattern for winding single fiberglass filaments 18 in what will hereinafter be referred to as the polar oriented direction. The filaments encircle the dome portions of the liner, and extend at an acute angle to the longitudinal axis of the cylindrical portion 12.

FIG. 2 illustrates a pattern for winding the single fiberglass filaments 18 in what will hereinafter be referred to as the cylindrically oriented direction. The filaments encircle the liner at substantially right angles to the longitudinal axis of the cylindrical portion.

It should be noted at this point that while the drawings illustrate the filaments 18 as having considerable cross-sectional dimension, and illustrate the overwrapped vessel as if the various overwraps each comprised only a single layer of filament material, they have been shown as such simply for illustration purposes. In reality the filaments will be of a very small cross section and during the wrapping of filament material in a particular direction the filaments will be wound in many turns and may therefore make up many layers of filament material. Of course, this will be readily apparent to those skilled in the art.

Figure 3:
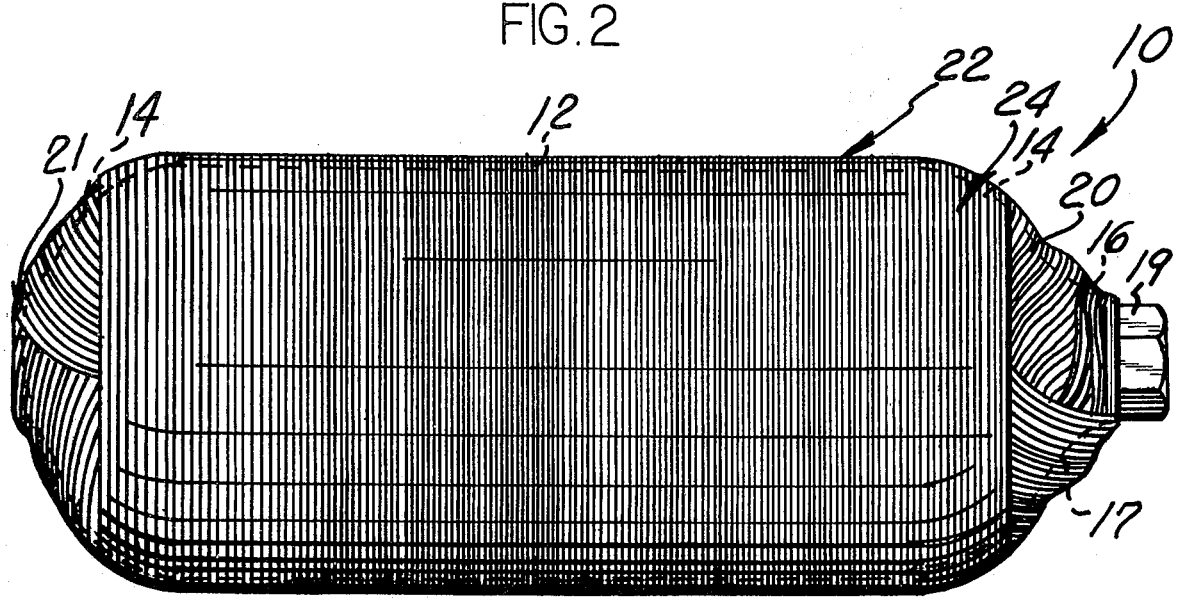
FIG. 3 is a view of the pressure vessel after the first two winding steps have been performed.
Figure 4:
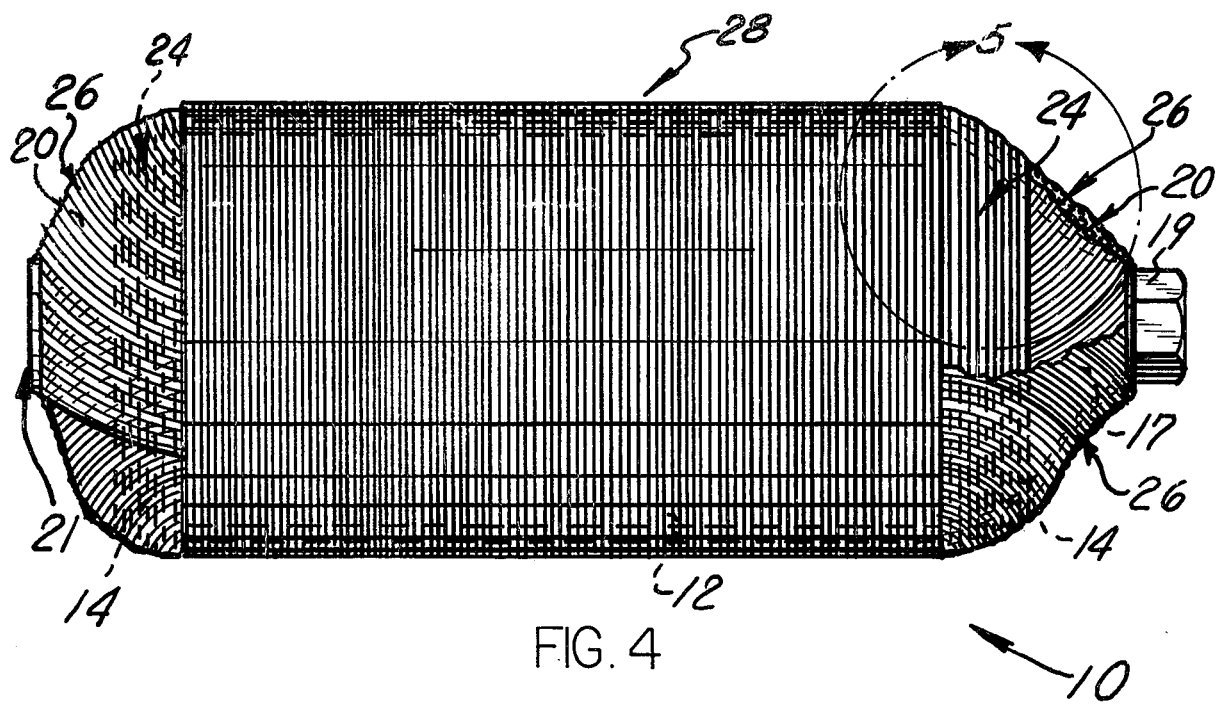
FIG. 4 is a composite view of a completely overwrapped pressure vessel, with a section of the second polar oriented wrap cut away.
Figure 5:
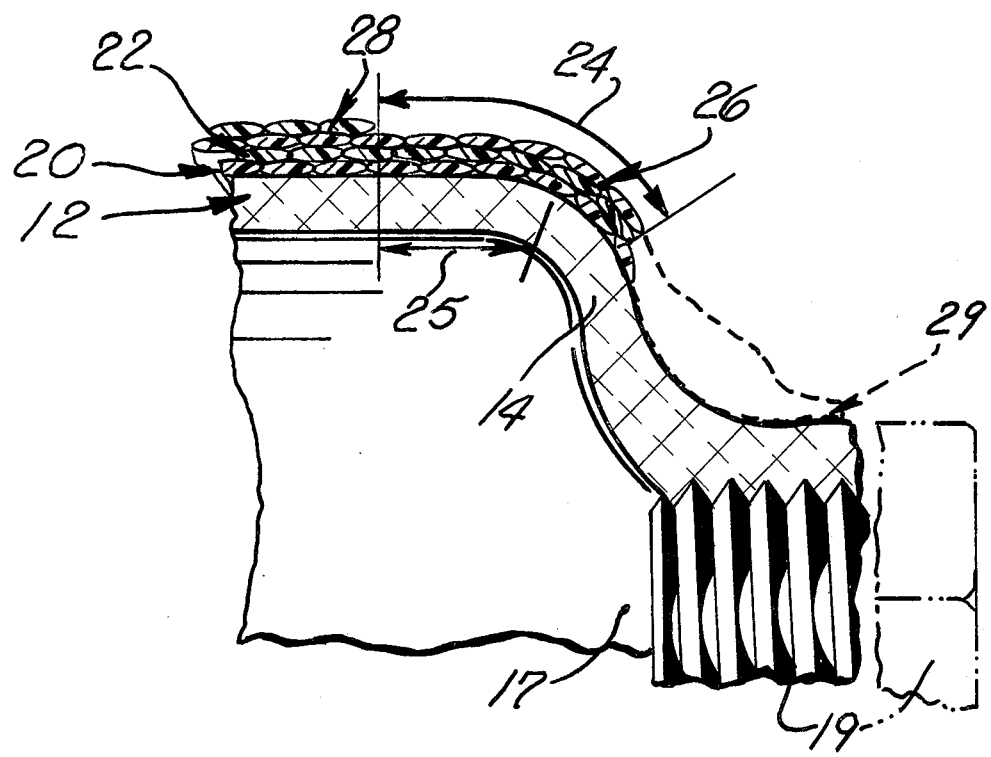
FIG. 5 is a cross-sectional view of a completely overwrapped pressure vessel, taken substantially of section 5 of FIG. 4.

A vessel formed by the method of the present invention may be seen by reference to FIGS. 4 and 5. In FIG. 4, portions of the overwrap material have been cut away to better illustrate the overwrap pattern which is an aspect of the present invention. As shown in FIGS. 4 and 5, the overwrap pattern includes a polar oriented filament overwrap 20 which covers the entire surface of the liner and which is in engagement therewith. Cylindrically oriented filament overwrap 22 overlies the polar overwrap 20 and, as shown in FIGS. 3, 4 and 5, includes a portion 24 which covers the junction of the cylindrical portion of the liner and the dome portion of the liner (the area of the liner designated 25) and extends over part of the dome portion 14. Some sloughing of filament material may occur at the neck and end portions as shown in the drawings. However, such sloughing does not have an appreciable effect on the operating performance of the pressure vessel in accordance with the present invention.

The second polar filament overwrap 26 is shown covering the first cylindrrical overwrap 22 and that second polar overwrap 26 is in fact applied in a similar fashion to the first polar overwrap, and thereby has the effect of holding the cylindrical overwrap 22 against movement relative to the liner. (Note that in FIG. 5 the outline of the portion of the overwrap material near the neck of the vessel is defined in broken lines and is labeled 29. This is only for illustration purposes, but in practice the polar overwrap 26 will appear similar to polar overwrap 20, as shown in FIG. 3, in the vessel neck area). The final step in applicant's overwrapping technique involves the application of the top cylindrical filament overwrapping material against the liner. As particularly depicted in FIGS. 4 and 5, the top cylindrical overwrap 28 does not extend over the junction between the cylindrical portion and either dome portion.

The preferred embodiment of the present invention includes aluminum as a liner material. The choice of aluminum is dictated because of its high strength/density ratio, low modulus, outstanding toughness, and environmental compatibility. In the specific preferred embodiment of applicant's invention, the aluminum liner is made with a 6000 series aluminum alloy specifically 6070-T6 aluminum. Further, referring specifically to FIG. 5, it will be clear that the liner is formed of a fairly uniform thickness, particularly where the cylindrical and dome portions meet.

The selection of a suitable filament material involves two primary considerations, cost and fiber strength. In the preferred embodiment of the present invention the above requirements may be best satisfied through the use of Owens Corning S-2 fiberglass. Furthermore, in the preferred embodiment it has also been found that a suitable resin which is compatible with the aforesaid fiberglass may comprise Epon 828/1031/NMA/BDMA resin. Of course, other resins and filaments could be utilized.

The suitable selections of the liner material and the filament material should also be determined by taking into consideration the criterion that the liner material be mechanically compatible with the overwrapped material. Compatibility in this sense means that the strain imparted to the liner during pressurization and the corresponding strain of the glass overwrap must be reversible during depressurization of the vessel, i.e., since the filament strains elastically throughout the operating pressurization and depressurization cycles, the liner should also strain elastically during such cycles. Moreover, it must be reversible for each cycle without liner malfunction. The concept of mechanical compatibility in cylindrical vessel was reported in the *Journal of Spacecraft and Rockets*, July, 1967, p. 872, in an article by R. H. Johns and A. Kaufman, entitled: "Filament Overwrapped Metallic Cylindrical Pressure Vessels."

In the practice of the present invention the force balance between the liner prestressed in compression and its overwrap prestressed in tensiion is obtained before the vessel is placed in service. By correctly matching the material stresses, the liner may operate elastically through a greatly increased strain range and the overwrap can be used at efficient stress levels. The prestress condition is obtained by putting a newly-fabricated vessel through a "sizing" pressurization cycle where the liner is strained beyond its proportional limit and yields as much as 2%. When depressurized, the desirable stress state is attained because the metal unloads elastically and is forced into compression by the elastic overwrap.

The design characteristics of a completely overwrapped fiberglass pressure vessel are detailed and are therefore preferably determined with computer assistance. A suitable computer program for this purpose is entitled: "Computer Program for the Analysis of Filament Reinforced Metal-Shell Pressure Vessel," and may be found in NASA Scientific and Technical Aerospace Reports, Feb. 8, 1968 issue, v6, n3, page 419, the disclosure of which is hereby incorporated by reference.

The required computer program input parameters include pressure vessel geometry, liner material properties, filament material properties, filament and longitudinal metal stresses present upon winding, and design limit conditions. For the preferred embodiment of the present invention the variable program input parameters selected for the vessel include: liner thickness, filament design stress, design pressure, and sizing pressure. Other selected parameters may be dictated by performance requirements (vessel length and diameter which affect volume), or as a result of material selection (density, modulus and Poisson's ratio).

The computer output will then include such data as: dome contour, axial and hoop overwrap thickness, stress values (at sizing pressure, zero pressure, operating pressure, proof pressure, and at required minimum burst pressure), along with projected vessel component weights and volumes.

For the vessel to be designed to the aforementioned specifications, i.e., operating pressure of 4500 PSIG (charge pressure of 4000 PSIG), a proof pressure of 6750 PSIG and a minimum burst pressure of 9000 PSIG, an aluminum liner of 0.133 in thickness, and a sizing pressure of 7600 PSIG were found to yield design stress output values within an acceptable range. Of course other liner thicknesses and operating pressures could be utilized.

In the construction of a pressure vessel in accordance with the present invention, formation of the liner is begun by impact extruding a tubular blank with a solid base. The blanks are then solution treated and aged prior to forming. Thereafter, the closed end of the blank is contoured, and the blank is subjected to two neck forming operations, the first in a hot forming die and the second in a cold sizing die. Neck forming in this manner tends to minimize neck wrinkling. The final liner formation steps involve heat treating and machining. As seen in FIG. 5, the liner thickness at the junction of the cylindrical portion with the dome portions will be substantially uniform. The liner throat is fabricated as a threaded section for receiving the threaded portion of the end plug, and suitable sealing rings and washers may be used to further seal the port when the end plug is inserted. After formation of the liner the filament winding operation is performed. Equipment found suitable for use to effect this winding is the Entec Model 430 Filament Winding Machine which is known in the art and which is capable of winding in both the polar oriented and cylindrically oriented directions. During the preferred sequence, the first polar overwrap is effected by the winding of 98 circuits with a 4-roving delivery system comprised of 20 ends per roving about the liner. Next, seven layers of cylindrical material (14 passes with a 4-roving delivery system comprised of 20 ends per roving) are applied, and, of course, the cylindrical material is wound so as to cover the junction of the cylindrical portion with the dome portions. FIG. 3 shows the vessel after the foregoing two portions of the winding sequence.

Next, the remaining polar-oriented material, (147 circuits with a 4-roving delivery system comprised of 20 ends per roving) is then applied in a similar fashion to the original polar wrapping, and has the effect of holding the cylindrical wrapping against movement relative to the vessel. Finally, two layers of cylindrical material (four passes with a 4-roving delivery system comprised of 20 ends per roving) are then applied to a central region of the cylinder. The completely overwrapped vessel is shown in FIG. 4. Of course, the filament material is to be resin coated as it is wound about the liner. This is effected by drawing the filament through a resin filled reservoir just before it is wrapped. Heat curing of the vessel follows the overwrapping steps, and for the vessel whose specifications have been set forth above, the heat curing temperature should not exceed 350°F.

After the vessel has been overwrapped and heat cured, the sizing pressurization step is performed. This is accomplished, for the vessel set forth by the design characteristics determined heretofore, by increasing the vessel pressure to 7600 PSIG at a rate not to exceed 500 PSI per min. and then reducing the vessel pressure to ambient.

During this cycle, when the pressure exceeds the yield strength of the metallic liner, the liner will deform plastically outwardly and tend to retain the enlarged configuration to which the liner was plastically deformed. However, the elastic limit of the filament overwrap will not be exceeded during the pressurization and plastic deformation of the liner. Due to the plastic deformation of the liner, when the liner has elastically unloaded, the filament overwrap is still in tension. Therefore, the filament overwrap applies generally inwardly directed forces to the outer surface of the liner when it reaches the elastically unloaded condition. These inwardly directed oveerwrap forces are effective to compress and elastically deform the liner. However, they are of insufficient magnitude to plastically deform the liner in compression. Therefore, after the sizing pressurization cycle the overwrap filament is stressed in tension and the liner is stressed in compression.

To effect a plastic outward deformation and bursting of the liner after the sizing pressurization cycle, it is necessary to increase the pressure in the liner to a value sufficient to overcome the compression forces in the liner and to effect outward deformation of the liner with a force sufficient to rupture the strong overlap filament. Under normal operating pressures, the pressure forces may be sufficient to overcome the compression forces in the liner. However, the pressure forces will not, during normal use, be of a magnitude sufficient to plastically deform the liner against the influence of the filament overwrap.

It should be noted that while sized pressure vessels in accordance with this invention will exhibit some crazing, the effect of such crazing on vessel performance will be minimal.

A pressure vessel manufactured in the manner set forth above will have particular application in portable breathing systems of the type commonly used by firemen and scuba divers. On the other hand, it will be readily obvious to those of ordinary skill in the art that the foregoing method can be used to manufacture pressure vessels for different types of applications with equally satisfactory results.

Similarly, while the specific preferred embodiment illustrated in the drawings has fibrous overwrapping material of glass, it is contemplated that other fibrous materials, including graphite, boron or Kevlar, may be used. Of course, the specific fibrous materials utilized may vary with variations in the environment in which the pressure vessel is utilized.

I claim:

1. A method of manufacturing a pressure vessel including the steps of forming a liner in the shape of a cylindrical portion and a dome portion at each end thereof, overwrapping the liner by winding filament material thereabout in the following sequence:
   a. wrapping filament material about the liner in the polar direction to form a first polar overwrap,
   b. wrapping filament material over the first polar overwrap in a cylindrically oriented direction and of sufficient extent to cover the junctions of the cylindrical portion with the dome portions to form a first cylindrical overwrap, and
   c. wrapping filament material over the first cylindrical overwrap in the polar direction to form a second polar overwrap which holds the cylindrical overwrap against movement relative to the liner.

2. A method as set forth in claim 1 further including the step of wrapping filament material over the second polar overwrap in the cylindrically oriented direction overlying the cylindrical portion of the liner, thereby forming a second cylindrical overwrap.

3. A method as set forth in claim 2 wherein the step of forming the second cylindrical overwrap includes the step of terminating the wrapping of the filament material adjacent to the junctions of the cylindrical portion with the dome portions.

4. A method as set forth in claim 1 wherein said step of forming a liner includes the step of integrally forming the dome and cylindrical portion of aluminum.

5. A method as set forth in claim 4 wherein said step of overwrapping the liner includes the step of providing filament material made of fiberglass, and further including the step of coating the fiberglass filament material with an epoxy resin prior to wrapping it around the liner.

6. A method as set forth in claim 5, and further including the step of heat curing the vessel after overwrapping the liner.

7. A method as set forth in claim 1, and further including the step of pressurizing the vessel beyond the elastic limit of the liner after overwrapping the liner, elastically unloading the liner by reducing the pressure, and compressing the liner with the filament overwrap.

8. A method as set forth in claim 1 wherein said step of overwrapping the liner includes the step of providing filament material made of graphite.

9. A method as set forth in claim 1 wherein said step of overwrapping the liner includes the step of providing filament material made of boron.

10. A method as set forth in claim 1 wherein said step of overwrapping the liner includes the step of providing filament material made of Kevlar.

11. A method of manufacturing a pressure vessel including the steps of forming a tubular blank of aluminum, forming the tubular blank into a liner in the shape of a cylindrical portion having a wall thickness and a dome portion of substantially equal wall thickness at each end thereof, completely overwrapping the liner by winding filament material in alternating polar oriented and cylindrically oriented winding patterns with at least part of a cylindrically wound winding pattern covering the junctions of the cylindrical portion and each dome portion, the filament material having a higher modulus of elasticity than the aluminum liner, pressurizing the vessel above the elastic limit of the metallic liner and then depressurizing the vessel, so that the metal liner unloads elastically, and a compressive stress is thereby applied to the metallic liner by the overwrap filaments.

12. A method of manufacturing a pressure vessel including the steps of forming a tubular blank of metallic material forming the tubular blank into a liner in the shape of a cylindrical portion having a wall thickness and a dome portion of substantially equal wall thickness at an end thereof, completely overwrapping the liner by winding filament material in alternating polar oriented and cylindrically oriented winding patterns with at least part of a cylindrically wound pattern covering the junction of the cylindrical portion with the dome portion, the filament material having a higher modulus of elasticity than the metallic liner, pressurizing the vessel above the elastic limit of the metallic liner and then depressurizing the vessel, so that the metal liner unloads elastically, and a compressive strength is thereby applied to the metallic liner by the overwrapped filaments.

13. A method of manufacturing a pressure vessel including the steps of forming a liner in the shape of a cylindrical portion and a dome portion at an end thereof, overwrapping the liner by winding filament material thereabout in the following sequence:
   a. wrapping filament material about the liner in the polar direction to form a first polar overwrap;
   b. wrapping filament material over the first polar overwrap in a cylindrically oriented direction and of sufficient extent to cover the junction of the cylindrical portion with the dome portion to form a first cylindrical overwrap;
   c. wrapping filament material over the first cylinder overwrap in the polar direction to form a second polar overwrap which holds the cylindrical overwrap against movement relative to the liner;
   d. wrapping filament material over the second polar overwrap in the cylindrically oriented direction overlying the cylindrical portion of the liner and terminating the wrapping of said wrapping of the filament material adjacent to the junction of the cylindrical portion with the dome portion.

14. A method of manufacturing a pressure vessel including the steps of forming a tubular blank of aluminum, forrming the tubular blank into a liner in the shape of a cylindrical portion having a wall thickness and a dome portion of substantially equal wall thickness at at least one end thereof, completely overwrapping the liner by winding filament material with the filament material covering both the cylindrical portion and the dome portion, the filament material having a higher modulus of elasticity than the aluminum liner, pressurizing the vessel above the elastic limit of the metallic liner and then depressurizing the vessel so that the metal liner unloads elastically and a compressive stress is thereby applied to the metallic liner by the overwrapped filaments.

* * * * *